Sept. 30, 1924.
C. SEELEY
1,510,418
PRESSURE REGULATING GAS VALVE
Filed May 16, 1923
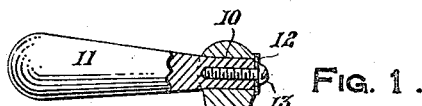
FIG. 1.
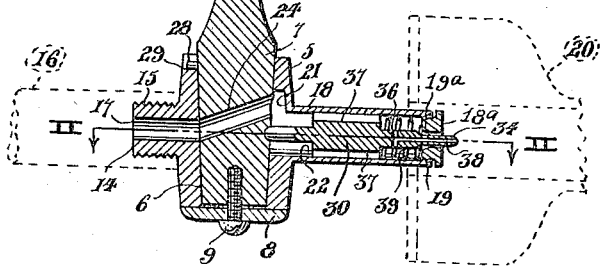
FIG. 2.   FIG. 3.
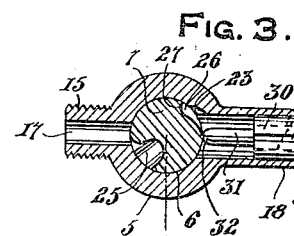
FIG. 4.   FIG. 5.
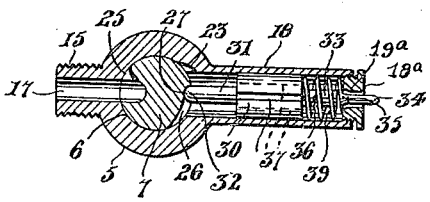
FIG. 6.
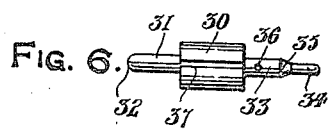
FIG. 7.
FIG. 8.   FIG. 9.
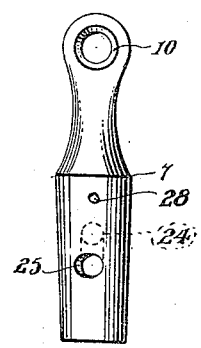
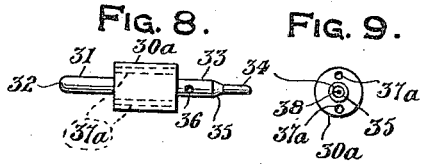
Inventor
Clarence Seeley
By
F. A. Bryant
Attorney.

Patented Sept. 30, 1924.

1,510,418

UNITED STATES PATENT OFFICE.

CLARENCE SEELEY, OF ELMIRA, NEW YORK.

PRESSURE-REGULATING GAS VALVE.

Application filed May 16, 1923. Serial No. 639,371.

*To all whom it may concern:*

Be it known that I, CLARENCE SEELEY, a citizen of the United States of America, residing at Elmira, in the county of Chemung and State of New York, have invented certain new and useful Improvements in Pressure-Regulating Gas Valves, of which the following is a specification.

This invention relates to new and useful improvements in pressure regulating gas valves.

An important object of the invention is to provide a duplex valve capable of regulating the velocity or pressure of the flow of gas.

A further object of the invention is to provide a duplex valve wherein the amount of gas allowed to flow is controlled by one valve unit while the pressure or velocity of the flow is controlled by a second unit.

A still further object of the invention is to provide a valve of the above mentioned type which is of simple construction, strong, and durable and one that may be manufactured at a very nominal cost.

Other objects and advantages of the invention will be apparent during the course of the following description.

In the accompanying drawing forming a part of this specification and in which like numerals are employed to designate like parts throughout the same, Figure 1 is a vertical sectional view, partly in elevation, of the duplex valve construction embodying this invention and positioned in proper relation to a supply pipe and air mixture chamber shown in dotted lines, Figure 2 is a horizontal sectional view taken on line II—II of Fig. 1 and shows both the primary and secondary valves in their open positions, Figure 3 is a somewhat similar view to Fig. 2 with the exception that it shows the primary valve partially open and the secondary valve in its entirely closed position, Figure 4 is a side elevational detail view of a globe valve which constitutes the primary valve in this duplex construction, the said view being taken from the outlet side of this globe valve, Figure 5 is a side elevational view of the primary valve shown in Fig. 4 and taken from the inlet side of the same, Figure 6 is a side elevational detail view of the secondary valve embodying this invention, Figure 7 is a detail end view of the valve shown in Fig. 6, Figure 8 is a detail side elevational view of a modified form of a secondary valve embodying this invention, and Figure 9 is an end elevational view of the modified form of secondary valve shown in Fig. 8.

In the drawing, wherein for the purpose of illustration is shown a preferred embodiment of this invention, the numeral 5 designates the body portion of the valve casing or shell which is provided with a tapered bore 6 adapted for receiving the tapered portion of the globe valve 7 which is retained therein by means of a disk 8 adapted for closing the lower end of the bore 6 and for receiving a screw 9 which is threaded into the bottom end of the said globe valve 7. It will be seen that this tapered bore 6 and tapered portion 7 of the globe valve will be retained in proper relation to each other by the disk 8 and screw 9 for preventing any leakage of gas from the construction. The upper portion of the globe valve 7 is provided with a transverse opening 10 adapted for receiving the shank of the handle member 11 therein which is retained in position by means of the washer 12 and screw 13. The shell or casing 5 is provided with a tubular boss 14 having external threads 15 that are provided for suitably connecting the construction to a supply pipe 16 as shown in dotted lines in Fig. 1. The bore 17 of this tubular boss communicates directly with the interior portion of the shell or casing 5. Positioned diametrically opposite the tubular boss 15 is an integrally formed cylinder 18 which communicates directly with the tapered bore of the casing 5 and is provided at its outer open end with internal screw threads 19 for a purpose to be described hereafter. This cylinder 18 preferably terminates within a mixture chamber 20, as shown in dotted lines in Fig. 1. The shell or casing 5 is provided with a vertically extending cutout portion 21 which forms a continuation of the tapered bore 6 and the bore 22 of the cylinder 18. The shell or casing 5 is further provided with a pocket or cutout portion 23 formed in the tapered wall 6 and extends circumferentially of the said bore from the cylinder 18. Referring particularly to Figs. 1 to 5 inclusive it will be seen that the tapered portion of the globe valve 7 is provided with an inclined bore 24 which extends transversely through the same with the lower end of the said bore axially alining with the bore 17 formed in the tubular boss 16 while the upper end of the said transverse bore 24 alines with the recess or pocket 21, as best shown in Fig. 1. Referring particularly to Figs. 2, 3 and 5 it will be seen that the lower or inlet end of the transverse bore 24 is of elongated shape, as designated by the numeral 25. Referring particularly to Figs. 2, 3 and 4 there is shown a circumferentially extending, cam-shaped recess 26 formed in the tapered wall of the globe valve 7, and having its deeper end, designated by the numeral 27. It will be seen that this deeper end 27 is diametrically opposite the lower or inlet end of the inclined bore 24. Referring particularly to Figs. 1, 4 and 5 there is shown a laterally extending pin 28 carried by the said globe valve for the purpose of occupying a cutout portion 29 formed in a quarter of the upper edge of the shell or casing 5 for the purpose of limiting the rotary movement of the said globe valve to 90° of a circle.

Referring particularly to Figs. 1 to 3 inclusive and 6 to 9 inclusive there are shown two forms of secondary valves which are slidably positioned in the cylinder portion 18 as best shown in Figs. 1 to 3. The outer open end of the cylinder portion 18 has removably engaging the threads 19 a valve seat carrying plug 18$^a$ as shown, the said valve seat being designated by the numeral 19$^a$. The form of secondary valve shown in Figs. 1 to 3, 6 and 7 consists of a body portion 30 of cylindrical formation having an axially extending solid stem 31 which is rounded at its extreme outer end as designated by the numeral 32. Extending axially from the opposite face of the body portion 30 is a stem 33 having a reduced portion 34 which forms a tapered valve face 35 as shown. Referring particularly to Figs. 1 and 6 there is shown a transverse bore 36 formed in the stem 33 which communicates with a longitudinally extending bore 38 which forms the communication between the transverse bore 36 and the extreme outer end of the reduced portion 34 of the said stem 33. The said body portion 30 is provided with a series of longitudinally extending grooves 37 which allow passage of gas from the bore 6 of the valve casing 5 to the extreme outer end of the cylinder portion 18. Encircling the stem 33 and bearing against the outer face of the body portion 30 is a spiral spring 39 which forces inwardly upon this said secondary valve for retaining the rounded end 32 of the stem 31 in constant engagement with the globe valve 7.

The modified form of secondary valve shown in Figs. 8 and 9 consists of a body portion 30$^a$ which is provided with suitably spaced longitudinally extending bores 37$^a$ as shown. The remaining portions of the modified form of valve are constructed in identically the same manner as the form of secondary valve described heretofore.

The operation of the device is as follows:—

When the globe valve 7 is moved to its fully opened position as shown in Figs. 1 and 2 the total amount of gas is allowed to pass through the bore 17 formed in the boss 15, through the bore 24 formed in the said globe valve 7, through the cylindrical portion 18 and through the transverse and longitudinally extending bores 36 and 38 formed in the secondary valve stem 33 as well as past the tapered valve face 35 formed on this stem. Should it be desired to reduce the total amount of gas fed through the valve construction, but to increase the velocity or pressure of the flow, the globe valve 7 is partially rotated to position the same as shown in Fig. 3. It will be seen that the elongated lower end 25 of the transverse bore 24 will still allow the passage of gas through this bore from the tubular boss 15. The inner or rounded end 32 of the secondary valve stem 31 is at this time entirely removed from the circumferentially extending, cam-shaped recess 26 formed in the globe valve 7 with the result that the tapered valve face 35 is tightly seated against the removable plug 18$^a$, as shown. The gas will be allowed to pass outwardly of the cylinder portion 18 through the transverse bore 36 and longitudinally extending bore 38 formed in the secondary valve stem 33 with the result that the velocity or pressure of the flow will be greatly increased. It will be understood that a movement of the handle 11 through a quarter of a circle will entirely close both the primary or globe valve 7 and the secondary valve with the result that no gas is allowed to pass through the device. The purpose of the spiral spring 39 is to retain the rounded end 32 of the secondary valve stem 31 in engagement with the primary or globe valve 7 at all times for the purpose of allowing this rounded end to ride into the circumferentially extending, cam-shaped recess 26 when the same is brought into proper position. When the deeper end 27 of this recess 26 is brought into axial alinement with the boss 15 and cylinder 18 the secondary valve will be moved to its full open position.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a device of the class described, a casing, tubular extensions carried by said casing constituting inlet and outlet passages for the same, a valve seat associated with said outlet extension, a valve positioned in said casing for controlling the amount of flow passing therethrough, a longitudinally grooved member positioned in said outlet extension, a reduced axially extending stem having a passage therethrough forming a part of said member, a valve surface on said stem intermediate its length, and an additional reduced stem carried by said member for moving said surface against said seat for restricting the discharge to the passage through the first mentioned stem when the casing carried valve is moved to a predetermined position.

2. In a device of the class described, a tubular casing, axially alined tubular inlet and outlet extensions carried by said casing, said casing having a vertically extending cutout portion formed in its bore opening into the bore of the outlet extension and positioned thereabove, and a rotary member positioned in the bore of said casing, said rotary member having an inclined transverse bore adapted to form communication between the inlet extension and the outlet extension by way of the cutout portion when the member is in a proper position.

In testimony whereof I affix my signature.

CLARENCE SEELEY.